US 8,186,136 B2

(12) United States Patent
Eick et al.

(10) Patent No.: US 8,186,136 B2
(45) Date of Patent: May 29, 2012

(54) AGRICULTURAL HARVESTER WITH A DRAPER PLATFORM DIRECTION SHUTTLE

(75) Inventors: Bronson C. Eick, Fremont, IA (US); Thomas D. Bebemes, Ottumwa, IA (US)

(73) Assignee: Deere & Company, Moline, IL (US)

(*) Notice: Subject to any disclaimer, the term of this patent is extended or adjusted under 35 U.S.C. 154(b) by 193 days.

(21) Appl. No.: 12/417,757

(22) Filed: Apr. 3, 2009

(65) Prior Publication Data
US 2010/0251682 A1 Oct. 7, 2010

(51) Int. Cl.
*A01D 43/00* (2006.01)
(52) U.S. Cl. .................. 56/181; 56/11.2; 56/10.2 R
(58) Field of Classification Search ............... 56/10.2 R, 56/10.8, 11.2, 10.2 A, DIG. 2, DIG. 7, DIG. 15, 56/181
See application file for complete search history.

(56) References Cited

U.S. PATENT DOCUMENTS

| 4,186,816 | A | * | 2/1980 | Pfundstein | 180/243 |
| 4,522,018 | A | * | 6/1985 | Blakeslee | 56/181 |
| 4,663,919 | A | * | 5/1987 | Stroh et al. | 56/11.2 |
| 5,778,644 | A | * | 7/1998 | Keller et al. | 56/11.2 |
| 6,148,593 | A | * | 11/2000 | Heinsey et al. | 56/10.2 R |
| 6,871,483 | B1 | * | 3/2005 | Panoushek | 56/10.2 E |
| 7,275,616 | B2 | * | 10/2007 | Link et al. | 180/333 |
| 2003/0037985 | A1 | * | 2/2003 | Jeppe et al. | 180/333 |
| 2004/0013506 | A1 | * | 1/2004 | Guhr et al. | 414/526 |
| 2005/0014603 | A1 | * | 1/2005 | Brome et al. | 477/38 |
| 2007/0119136 | A1 | * | 5/2007 | MacGregor et al. | 56/10.2 H |
| 2008/0104937 | A1 | * | 5/2008 | Enns et al. | 56/168 |

* cited by examiner

*Primary Examiner* — Thomas Will
*Assistant Examiner* — Mai Nguyen (57) ABSTRACT

An agricultural harvester includes a draper cutting platform, and a traction unit carrying the draper cutting platform. The traction unit includes an operator station and a hydro handle within the operator station. The hydro handle includes a reverse shuttle switch which is manually actuatable by an operator to selectively reverse a travel direction of at least one movable component on the cutting platform.

22 Claims, 5 Drawing Sheets

AGRICULTURAL HARVESTER WITH A DRAPER PLATFORM DIRECTION SHUTTLE

FIELD OF THE INVENTION

The present invention relates to agricultural harvesters, and, more particularly, to agricultural harvesters including a draper cutting platform.

BACKGROUND OF THE INVENTION

An agricultural harvester, such as a windrower or combine, is a large machine used to harvest a variety of crops from a field. In the case of a combine, during a harvesting operation, a header at the front of the combine cuts ripened crop from the field. In the case of thinner stemmed crops such as soybeans, wheat, etc. which may be cut with a sickle bar carrying a plurality of knives, the header may also be known as a cutting platform. A feederhouse supporting the header transfers the crop material into the combine. Threshing and separating assemblies within the combine remove grain from the crop material and transfer the clean grain to a grain tank for temporary holding. Crop material other than grain exits from the rear of the combine. An unloading auger transfers the clean grain from the grain tank to a truck or grain cart for transport, or to another receiving bin for holding.

In the case of a windrower, during a harvesting operation, a header at the front of the windrower cuts ripened crop from the field. The crop is transported to the rear of the header and forming shields form a windrow of the crop between the tires of the vehicle for natural dry down of the crop. A subsequent field operation picks up the windrows for further processing, such as separating and cleaning in the case of grain crops, or baling or chopping in the case of hay.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform used on a combine has two side belts that convey crop material longitudinally, to the center of the platform, where a center feed belt moves the crop material laterally into the feeder housing. Each belt is wrapped around a pair of rollers, one being a drive roller and the other being an idler roller. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

One of the primary crops for draper platforms in the windrower application is canola. Canola is a dense, intertwining crop that can be difficult to cut and converge into a windrow. The seed pods are also vulnerable to shatter with resulting grain loss, particularly if the crop is mature. The inherent difficulty in harvesting crops such as canola can result in a crop flow stoppage on the platform (plugging). Unplugging the platform is not only difficult, but typically results in a large pile of crop in the windrow and grain loss from shattering. Crop piles in the windrow are very undesirable not only because the crop will cure at a slower rate than the rest of the windrow but, more importantly, because the combine operation that follows becomes difficult. The combine operator must approach the pile very slowly and carefully feed the material into the machine to prevent slugging of the combine rotor.

Plugs on current draper platforms on windrowers are typically cleared by raising the platform and backing the machine out of the crop. If this is not effective, the reel may be raised of lowered, the platform may be raised or lowered, or the machine may be moved back and forth until the crop flow is started again. In some cases it may be necessary to remove crop from the platform manually.

With current draper designs, the platform is engaged in the forward direction by a switch in the right hand console. The switch is latched in position. The reel can be reversed by moving the same switch to a second, momentary position. Only the reel is reversed. Other components on the platform are off. Reversing the reel effectively clears the platform, particularly if the reel is moved back and/or down as necessary to engage the crop. If the machine is moved in the reverse direction at the same time, the crop is discharged with minimum windrow disruption.

This operational process is difficult to coordinate. The platform engage switch on the console must be held in the platform reverse position while moving the hydro handle rearward to reverse the machine. Both of these functions are right hand functions. In addition, a button on the hydro handle must be activated to move the reel rearward and downward and the machine must be controlled with the steering wheel as it moves rearward. A typical scenario has the operator's right hand on the console to hold the platform engage switch in the reverse position, his left hand crossing to the hydro handle to move the machine rearward and reposition the reel, and the steering wheel left uncontrolled.

What is needed in the art is an agricultural harvester with a draper cutting platform which can be more easily cleared upon occurrence of a plug.

SUMMARY OF THE INVENTION

The present invention allows an operator to remove material from a plugged draper cutting platform while simultaneously backing the machine so that material can be fed back into the machine with minimum disruption to the resulting windrow.

The invention in one form is directed to an agricultural harvester, including a draper cutting platform, and a traction unit carrying the draper cutting platform. The traction unit includes an operator station and a hydro handle within the operator station. The hydro handle includes a reverse shuttle switch which is manually actuatable by an operator to selectively reverse a travel direction of at least one movable component on the cutting platform.

The invention in another form is directed to a hydro handle for use in an operator station of an agricultural harvester. The hydro handle includes a reverse shuttle switch which is manually actuatable by an operator to selectively reverse a travel direction of at least one movable component on the cutting platform.

The invention in yet another form is directed to a method of controlling the operation of a cutting platform on an agricultural harvester. The method includes the steps of: operating at least one movable component on the cutting platform in a forward travel direction; manually actuating a reverse shuttle switch on a hydro handle; and electronically controlling the at least one movable component, dependent on the manual actuation, to decelerate the at least one movable component from the forward travel direction, momentarily pause the at least one movable component, and then accelerate the at least one movable component in a reverse travel direction.

DETAILED DESCRIPTION OF THE INVENTION

Figure 1:
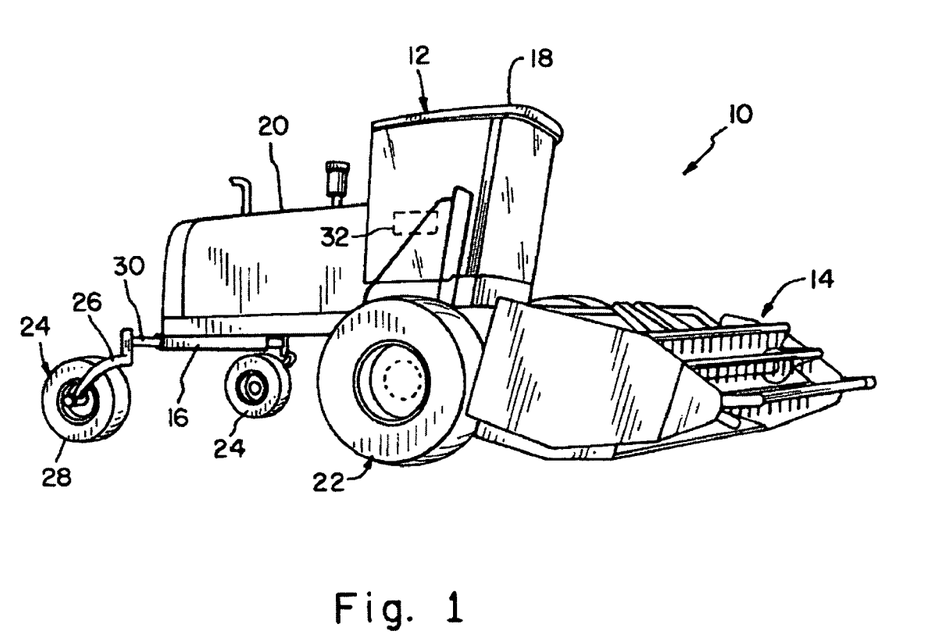
FIG. 1 is a perspective view of an embodiment of a windrower of the present invention.
Figure 2:
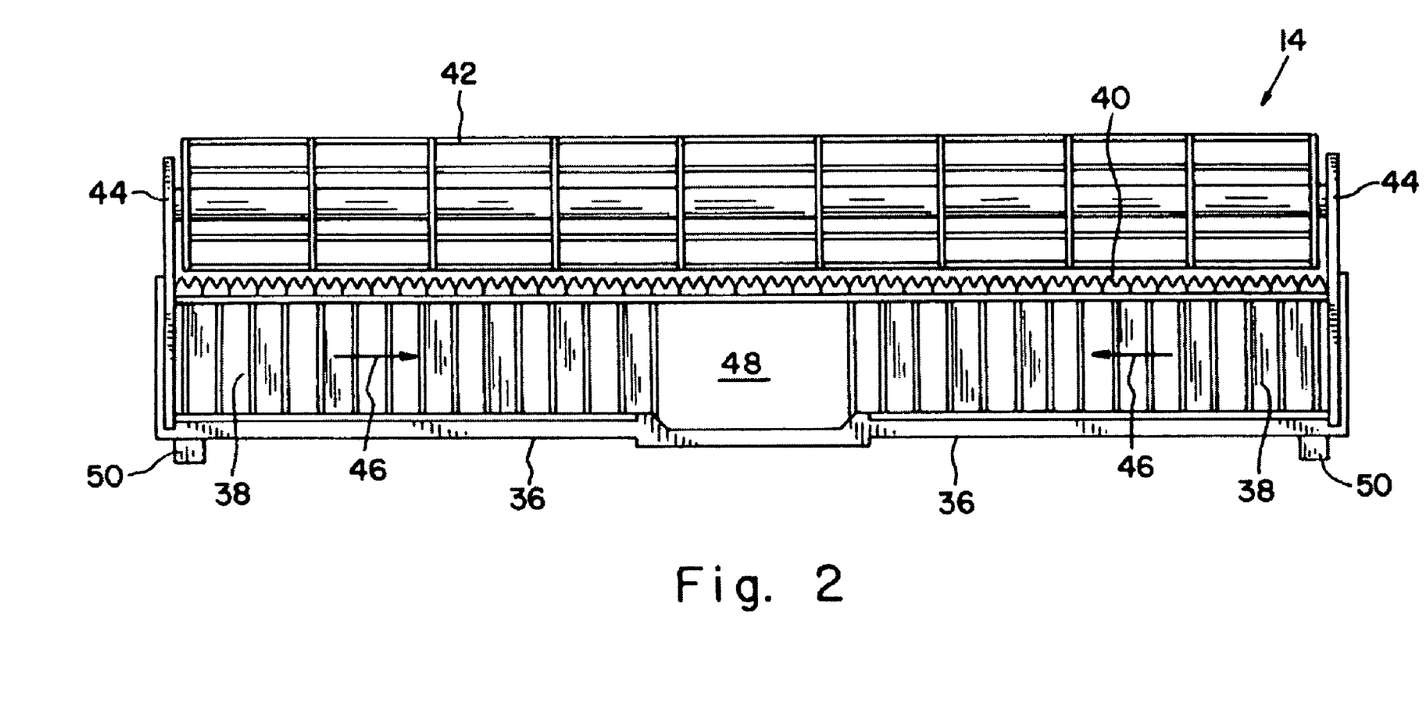
FIG. 2 is a top view of the draper cutting platform shown on the windrower of FIG. 1.

Referring now to the drawings, and more particularly to FIGS. 1 and 2, there is shown a work machine in the form of a windrower 10 of the present invention. Windrower 10 generally includes a traction unit 12 carrying a draper cutting platform 14. Draper cutting platform 14 may also alternatively be referred to as a "header" herein.

Traction unit 12 includes a frame 16 carrying typical components such as an operator station 18, engine compartment 20 housing an internal combustion (IC) engine (not shown), a pair of drive wheels 22, and a pair of rear caster wheel assemblies 24. Drive wheels 22 are typically at the front of traction unit 12 and caster wheel assemblies 24 are typically at the rear of traction unit 12. Drive wheels 22 are connected via respective drive motors with a dual path hydrostatic transmission (not shown). It is also possible to drive the drive wheels 22 with a different type of adjustable transmission, such as a hydromechanical or electromechanical transmission.

Each caster wheel assembly 24 includes a wheel arm 26 and a caster wheel 28. Wheel arm 26 is pivotably coupled at the upper end with machine frame 16, in particular, at the outboard end of a rear axle 30 forming part of machine frame 16. Wheel arm 26 is shown as a single arm which curves around to the side of wheel 28, but can also be configured as a fork with distal ends on opposite sides of wheel 28.

An electrical processing circuit 32, typically mounted within operator station 18 to the right or rear of the operator, is configured as one or more controllers. In the embodiment shown, controller 32 may include multiple controllers (not shown). For example, controller 32 may include an engine control unit (ECU) which electronically controls operation of the IC engine within engine compartment 20, and is coupled with a plurality of sensors associated with operation of the IC engine. Further, the ECU may receive output signals from a vehicle control unit (VCU) representing vehicle control parameters input by an operator, such as a commanded ground speed (indicated by a position of the throttle and/or hydro handle) or a commanded direction of windrower 10 (indicated by an output signal from a steering sensor representing an angular orientation of the steering wheel, or position of joystick(s)). Further, controller 32 may include a transmission control unit (TCU) which electronically controls operation of the transmission, and is coupled with a plurality of sensors associated with operation of the transmission. The ECU, VCU and TCU may be physically separate from each other and coupled together via a bus structure providing two-way data flow, such as a controller area network (CAN) bus. Such controller schemes are known and thus not specifically shown in the drawings or described in detail herein.

Draper cutting platform 14 is typically detachably mounted at the front end of traction unit 12 below operator station 18 using a lift assembly in the form of a pair of lift arms (not shown). Draper cutting platform 14 generally includes a frame 36, a pair of transverse side draper belts 38, a cutterbar assembly 40, a reel 42 and a pair of reel lift arms 44.

Draper cutting platform 14 is shown as a rigid draper platform in the illustrated embodiment, but could also be configured as a flexible draper. Further, draper cutting platform 14 is shown as not including a center fore-and-aft draper belt between side draper belts 38, but could be configured with a permanent or removable center draper belt. When the center draper belt is in the installed position, draper cutting platform 14 may be used as a harvester on a combine, and when in an uninstalled position, draper cutting platform 14 may be used as a swather or windrower. Additionally, draper cutting platform 14 is shown for use with windrower 10, but could be configured for use with other applications, such as for use with a traction unit in the form of a combine. Other configurations are also possible and within the scope of this invention.

Reel lift arms 44 are pivotally coupled at one end thereof with opposite outboard ends of frame 36. Reel lift arms 44 also rotationally carry reel 42 at opposite ends thereof. Each reel lift arm 44 may be selectively moved up and down through controller 32 using a hydraulic cylinder, and the pair of hydraulic cylinders are typically coupled in parallel so that they move together upon actuation.

Cutterbar assembly 40 is a sickle bar cutter in the illustrated embodiment. Cutterbar assembly 40 is driven by a suitable mechanical drive at one end of draper cutting platform 14. Alternatively, cutterbar assembly 40 may be a split cutterbar with a common drive or separate drives for each cutterbar.

Draper belts 38 travel in a transversely inward direction as indicated by arrows 46, and deposit the cut crop material into an open area 48 between the draper belts 38, forming a windrow of the cut crop material. Each draper belt 38 is separately driven by a respective drive motor 50 which is coupled with a respective end roller (not shown) carrying a corresponding draper belt 38. In the illustrated embodiment, each drive motor 50 is assumed to be a hydraulic motor under concurrent control of controller 32. The drive motors 50 could also be independently controlled, or could be in the form of electric motors which are under control of controller 32.

Figure 3:
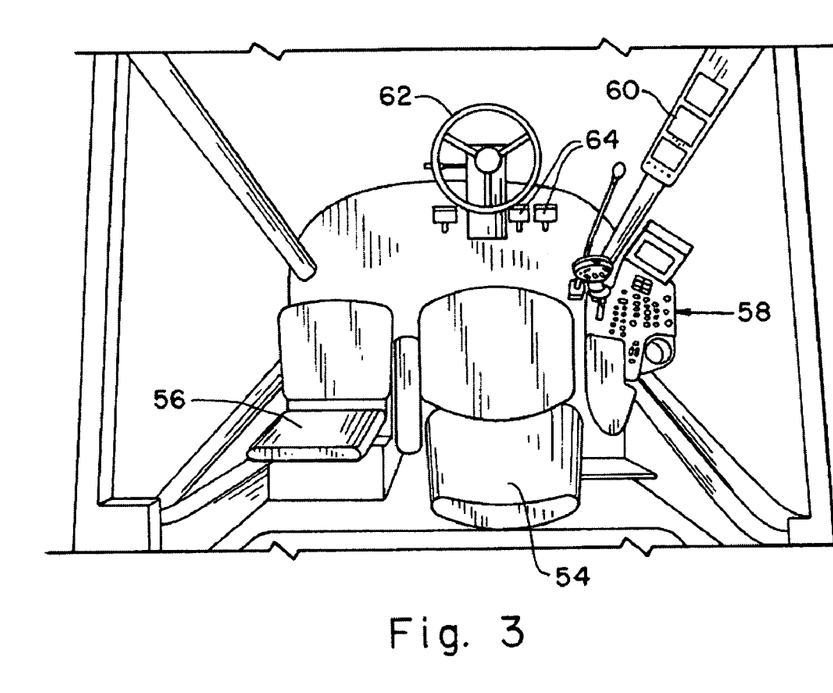
FIG. 3 is a top view of the operator station shown in FIG. 1.

Referring now to FIG. 3, operator station 18 includes an operator seat 54, optional passenger seat 56, armrest control unit (ACU) 58, corner post control unit 60, steering wheel 62 and (optional) brake pedals 64. Each of operator seat 54, passenger seat 56, corner post control unit 60, steering wheel 62 and brake pedals 64 are of known design and not described in detail herein.

Figure 4:
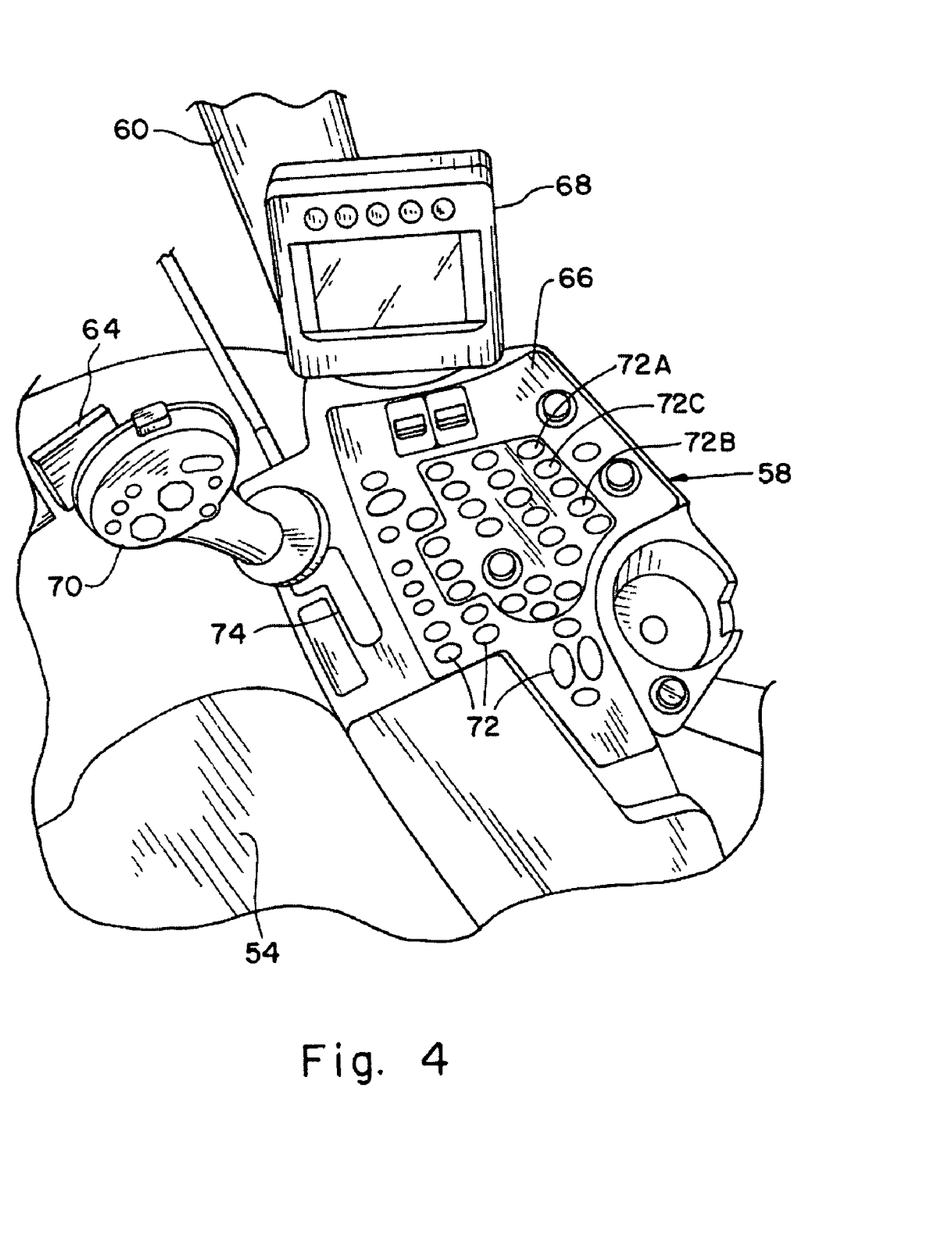
FIG. 4 is a perspective view of the armrest control unit shown in FIG. 3.

ACU 58, shown in more detail in FIG. 4, includes a control panel 66, display 68 and hydro handle 70. Display 68 is an electronic display and provides various status and warning indications to the operator. Control panel 66 includes a number of switches 72 for activating and deactivating various functions onboard traction unit 12 and draper cutting platform 14. Switches 72 can have different configurations, such as a mechanical toggle switch 72A associated with a platform engage function, rocker switch 72B, momentary push button switch, slider switch, etc, depending on the particular function associated with the switch. Further, switches 72 can be recessed to be flush or slightly below the upper surface of control panel 66 to prevent accidental actuation by an operator. Each of the switches 72 provide output signals to controller 32, which can be incorporated into ACU 58 or located elsewhere within operator station 18.

Figure 5:
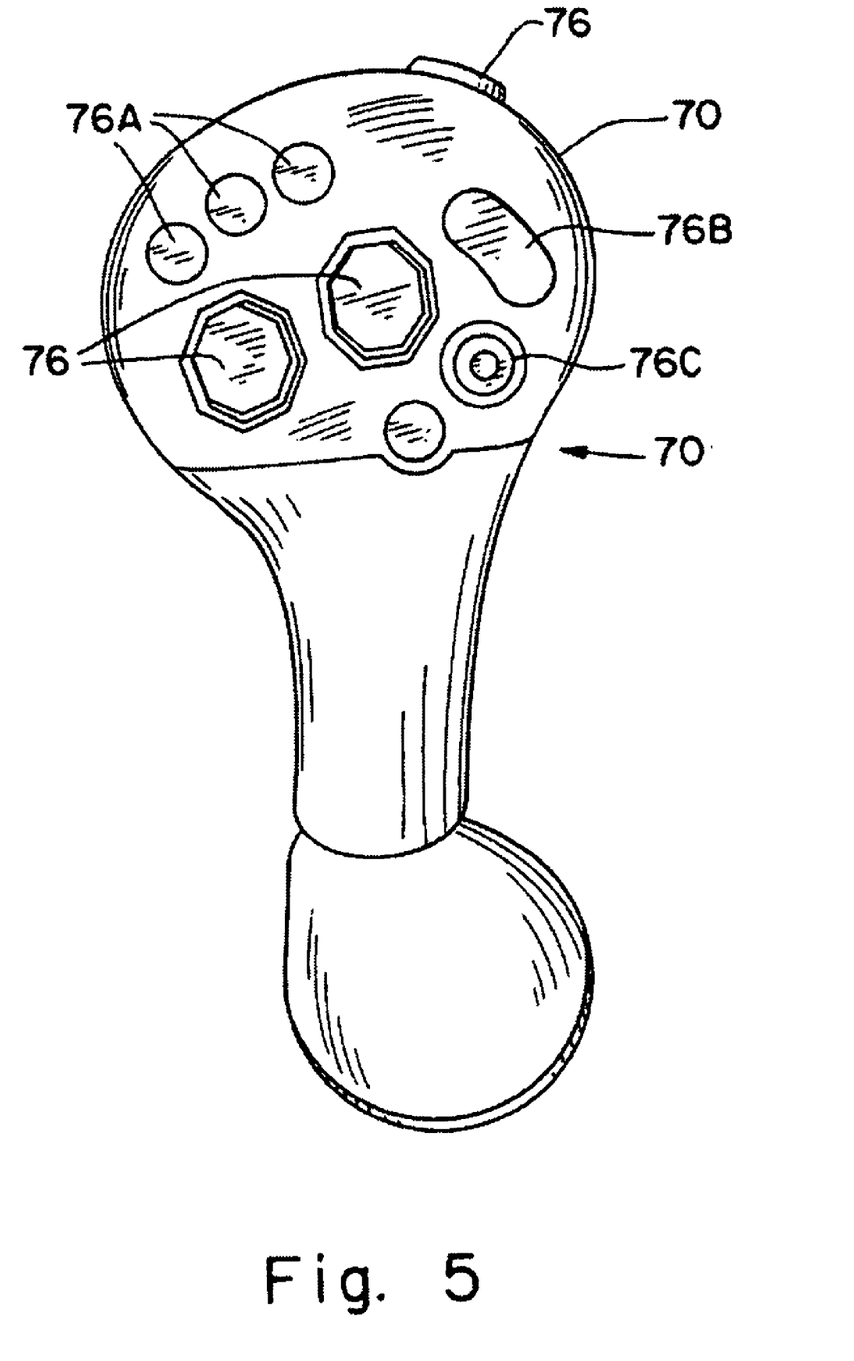
FIG. 5 is a front view of the hydro handle shown in FIGS. 3 and 4.

Referring to FIG. 5, hydro handle 70 controls forward and reverse movement of windrower 10, and is movable in a Z shaped slot 74 formed in control panel 66. Hydro handle 70 controls an infinitely variable transmission (IVT) such as a hydrostatic transmission or hydro-mechanical transmission, and is thus generically termed a "hydro" handle. It is also possible that an IVT in the form of an electromechanical transmission can be used, and the "hydro handle" designation is still intended to cover use with such an IVT.

Hydro handle 70 includes a number of switches 76 for activating and deactivating various functions onboard traction unit 12 and/or draper cutting platform 14. Switches 76 can have different configurations, such as a momentary push button switch 76A associated with a reel speed function, rocker switch 76B associated with the platform float or reel speed, slider switch, etc, depending on the particular function associated with the switch. Further, switches 76 can be recessed to be flush or slightly behind the vertical surface of hydro handle 70 to prevent accidental actuation by an operator. Each of the switches 76 provide output signals to controller 32, which as indicated above, can be incorporated into ACU 58 or located elsewhere within operator station 18.

According to an aspect of the present invention, switch 76C on hydro handle 70 is a reverse shuttle switch which is manually actuatable by an operator to selectively reverse a travel direction of at least one movable component on cutting platform 14. For example, reverse shuttle switch 76C can shuttle between a forward and reverse travel direction of reel 42 and/or draper belts 38.

During use, for example, an operator may desire to reverse the travel direction of reel 42, such as may occur upon plugging of draper cutting platform 14. Depressing reverse shuttle switch 76C a first time provides an output signal to electronic controller 32 which decelerates reel 42 from a forward travel direction, momentarily pauses reel 42, and then accelerates reel 42 in a reverse travel direction.

Reverse shuttle switch 76C can also include a forward shuttle function. More particularly, depressing reverse shuttle switch 76C a second time provides an output signal to electronic controller 32 which decelerates reel 42 from the reverse travel direction, momentarily pauses reel 42, and then accelerates reel 42 in the forward travel direction. Thus, sequentially depressing reverse shuttle switch 76C electronically controls movement of reel 42 to alternate between the forward and reverse travel directions.

Alternatively, the platform engage switch 72A associated with the platform engage function can be used to return the platform to the forward direction. More particularly, if the platform is running in the reverse travel direction, then moving the engage toggle to the OFF position, then re-engaging the platform in the forward direction will return the platform to the forward travel direction. Thus, engaging the platform engage switch 72A the first time controls movement of reel 42 in the forward travel direction, then depressing reverse shuttle switch 76C electronically shuffles movement of reel 42 to the reverse travel direction, then cycling the platform engage switch 72A OFF, then on a the second time electronically shuttles movement of reel 42 back to the forward travel direction.

As yet another option, a separate forward shuttle switch 72C can be provided on control panel 66 and used for the forward shuttle function. More particularly, if the platform is running in the reverse travel direction, then depressing the forward shuttle switch 72C provides an output signal to electronic controller 32 which decelerates reel 42 from the reverse travel direction, momentarily pauses reel 42, and then accelerates reel 42 in the forward travel direction. Thus, depressing platform engage switch 72A controls movement of reel 42 in the forward travel direction, then depressing reverse shuttle switch 76C electronically shuttles movement of reel 42 to the reverse travel direction, then depressing forward shuttle switch 72C electronically shuttles movement of reel 42 back to the forward travel direction.

With any of the above configuration options, it is apparent that to shuttle reel 42 between the forward and reverse travel directions, the operator need only depress reverse shuttle switch 76C, without removing the hand from hydro handle 70. This allows the operator to concurrently move hydro handle 70 rearward which changes the travel direction of traction unit 12 to the reverse travel direction. By simultaneously changing travel directions of traction unit 12 and reversing the travel direction of reel 42, bunching of the crop material in the windrow is minimized, which is desirable. The entire unplugging sequence is completed without requiring the operator to move either hand from the normal operating position. Further, normal safety features are retained in the platform engage switch 72A on control panel 66.

As a further option, it is also possible to move reel 42 along a predefined translational path to assist in engaging reel 42 with the plugged crop material on draper belts 38. For example, reel 42 can be concurrently moved rearward and/or downward upon depressing reverse shuttle switch 76C. Reel 42 can then be moved back to the previous or a predefined operating position upon shuttling reel 42 back to the forward travel direction using one of the techniques described above.

Further configuration options are also possible. For example, it is possible to locate the platform On/Off switch on the console with a push-and-hold button on the hydro handle to reverse the platform. This would not be as desirable as a toggle if the reel is adjusted rearward and downward to clear the platform while reversing the reel direction and backing the machine. This would be awkward to do while holding a button to reverse the platform. A further option would be an ON/OFF switch on the console and FWD and REV buttons on the hydro handle, if the ON/OFF switch was configured to engage the platform when it was activated rather than waiting for an input from the hydro handle.

With the foregoing configurations, the reasons that both the platform engage (ON/OFF) and platform direction (forward/reverse) shuttle switches are not located on the hydro handle include: 1) real estate—it's easier to add one button than two or three (FWD, OFF, REV) to the hydro handle; and 2) inadvertent engage of the platform ON/OFF function—the platform engage switch is a mechanical toggle. The platform engage switch must be pushed down and forward to engage the platform in either direction or pushed down and rearward to engage the platform in the reverse. The forward direction latches and the reverse direction is momentary. A direction shuttle on the hydro handle is acceptable, especially if it's recessed, because it doesn't engage or disengage the platform. The direction shuttle switch just changes the travel direction of the associated platform component, e.g., reel.

Other functions could be automated too, such as raising the platform slightly when the reverse toggle is hit, then returning to the preset height (return-to-cut height) when it is activated again. The present configuration is intended to manually adjust the reel when the toggle reverses the platform, but return to the preset reel position automatically when the platform is toggled back forward.

Having described the preferred embodiment, it will become apparent that various modifications can be made without departing from the scope of the invention as defined in the accompanying claims.

The invention claimed is:

1. An agricultural harvester, comprising:
   a draper cutting platform; and
   a traction unit carrying said draper cutting platform, said traction unit including an operator station and a hydro handle within said operator station, said hydro handle being operable to control a forward and reverse movement of the agricultural harvester and including a reverse shuttle switch which is manually actuatable by an operator to selectively reverse a travel direction of at least one of a draper and a reel on said cutting platform, the travel direction of a draper belt being a lateral movement relative to a travel direction of the harvester and the travel direction of a reel being a rotational movement of the reel, so that an operator can control the forward and reverse movement of the agricultural harvester while simultaneously reversing the travel direction of at least one of the draper belt and the reel with a single handed operation.

2. The agricultural harvester of claim 1, wherein said reverse shuttle switch is an electronic momentary switch.

3. The agricultural harvester of claim 2, wherein said reverse shuttle switch includes a forward shuttle.

4. The agricultural harvester of claim 3, wherein said reverse shuttle switch, upon a first actuation, provides an output signal to an electronic controller which decelerates said at least one of the draper belt and the reel from a forward travel direction, momentarily pauses said at least one of the draper belt and the reel, and then accelerates said at least one of the draper belt and the reel in a reverse travel direction.

5. The agricultural harvester of claim 4, wherein said reverse shuttle switch, upon a second actuation, provides an output signal to said electronic controller which decelerates said at least one of the draper belt and the reel from said reverse travel direction, momentarily pauses said at least of the draper belt and the reel component, and then accelerates said at least one of the draper belt and the reel in said forward travel direction.

6. The agricultural harvester of claim 1, wherein said hydro handle is incorporated into an armrest control unit (ACU).

7. The agricultural harvester of claim 6, wherein said ACU includes a control panel having a forward shuttle switch;
   wherein said reverse shuttle switch on said hydro handle provides an output signal to an electronic controller which decelerates said at least one of the draper belt and the reel from a forward travel direction, and accelerates said at least one of the draper belt and the reel in said reverse travel direction; and
   wherein said forward shuttle switch on said control panel provides an output signal to said electronic controller which decelerates said at least one of the draper belt and the reel from said reverse travel direction, and accelerates said at least one of the draper belt and the reel in said forward travel direction.

8. The agricultural harvester of claim 1, including a control panel and a platform engage switch on said control panel;
   wherein said reverse shuttle switch on said hydro handle provides an output signal to an electronic controller which decelerates said at least one of the draper belt and the reel from a forward travel direction, and accelerates said at least one of the draper belt and the reel in said reverse travel direction; and
   wherein said platform engage switch on said control panel provides an output signal to said electronic controller which decelerates said at least one of the draper belt and the reel from said reverse travel direction, and accelerates said at least one of the draper belt and the reel in said forward travel direction.

9. The agricultural harvester of claim 8, wherein said control panel is located on an armrest control unit (ACU).

10. The agricultural harvester of claim 1, wherein said hydro handle is associated with one of a hydrostatic transmission and a hydromechanical transmission.

11. A hydro handle for use in an operator station of an agricultural harvester, said hydro handle being operable to control a forward and reverse movement of the agricultural harvester and comprising a reverse shuttle switch which is manually actuatable by an operator to selectively reverse a travel direction of at least one of a draper belt and a reel on said cutting platform, the travel direction of a draper belt being a lateral movement relative to a travel direction of the harvester and the travel direction of a reel being rotational movement of the reel, while simultaneously controlling the forward and reverse movement of the agricultural harvester with a single handed operation.

12. The hydro handle of claim 11, wherein said reverse shuttle switch is an electronic momentary switch.

13. The hydro handle of claim 12, wherein said reverse shuttle switch includes a forward shuttle.

14. The hydro handle of claim 13, wherein said reverse shuttle switch, upon a first actuation, provides an output signal to an electronic controller which decelerates said at least one of a draper belt and a reel from a forward travel direction, momentarily pauses said at least one of a draper belt and a reel, and then accelerates said at least one of a draper belt and a reel in a reverse travel direction.

15. The hydro handle of claim 14, wherein said reverse shuttle switch, upon a second actuation, provides an output signal to said electronic controller which decelerates said at least one of a draper belt and a reel from said reverse travel direction, momentarily pauses said at least one of a draper belt and a reel, and then accelerates said at least one of a draper belt and a reel in said forward travel direction.

16. A method of controlling the operation of a cutting platform on an agricultural harvester, comprising the steps of:
   operating at least one of a draper belt and a reel on the cutting platform in a forward travel direction, the travel direction of the draper belt being a lateral movement relative to a travel direction of the harvester and the travel direction of the reel being rotational movement of the reel;
   manually actuating a reverse shuttle switch on a hydro handle;
   electronically controlling at least one of the draper belt and the reel, dependent on said manual actuation, to decelerate said at least one of the draper belt and the reel from said forward travel direction, momentarily pause said at least one of the draper belt and the reel, and then accelerate said at least one of the draper belt and the reel in a reverse travel direction; and
   simultaneously reversing a travel direction of the agricultural harvester.

17. The method of claim 16, wherein said reverse shuttle switch is an electronic momentary switch.

18. The method of claim 17, wherein said reverse shuttle switch includes a forward shuttle.

19. The method of claim 16, including the steps of:
   manually actuating said reverse shuttle switch a second time; and electronically controlling said at least one of the draper belt and the reel, dependent on said second manual actuation, to decelerate said at least one of the draper belt and the reel from said reverse travel direction, momentarily pause said at least one of the draper belt and the reel, and then accelerate said at least one of the draper belt and the reel in said forward travel direction.

20. The method of claim 16, including the steps of:
manually actuating a forward shuttle switch; and
electronically controlling said at least one of the draper belt and the reel, dependent on said manual actuation of said forward shuttle switch, to decelerate said at least one of the draper belt and the reel from said reverse travel direction, momentarily pause said at least one of the draper belt and the reel, and then accelerate said at least one of the draper belt and the reel in said forward travel direction.

21. The method of claim 20, wherein said forward shuttle switch is one of:
incorporated into a platform engage switch; and
separate from said platform engage switch.

22. The method of claim 21, wherein said forward shuttle switch is located on a control panel of an armrest control unit (ACU).

* * * * *

UNITED STATES PATENT AND TRADEMARK OFFICE
CERTIFICATE OF CORRECTION

| | |
|---|---|
| PATENT NO. | : 8,186,136 B2 |
| APPLICATION NO. | : 12/417757 |
| DATED | : May 29, 2012 |
| INVENTOR(S) | : Bronson C. Eick and Thomas D. Bebernes |

It is certified that error appears in the above-identified patent and that said Letters Patent is hereby corrected as shown below:

On the Title Page, Item (75) Inventor Thomas D. Bebemes should be listed as Thomas D. Bebernes.

Signed and Sealed this
Thirty-first Day of July, 2012

David J. Kappos
*Director of the United States Patent and Trademark Office*